United States Patent
Horn et al.

(10) Patent No.: US 12,342,212 B2
(45) Date of Patent: Jun. 24, 2025

(54) SYSTEMS AND METHODS FOR REVERSE AFFINITY LINK EXCLUSION FOR ULTRA-RELIABLE LOW LATENCY COMMUNICATION

(71) Applicant: Cisco Technology Inc., San Jose, CA (US)

(72) Inventors: Jakub Horn, San Jose, CA (US); Peter Psenak, Bratislava (SK)

(73) Assignee: CISCO TECHNOLOGY, INC., San Jose, CA (US)

( * ) Notice: Subject to any disclaimer, the term of this patent is extended or adjusted under 35 U.S.C. 154(b) by 360 days.

(21) Appl. No.: 17/820,125

(22) Filed: Aug. 16, 2022

(65) Prior Publication Data
US 2024/0064547 A1 Feb. 22, 2024

(51) Int. Cl.
*H04L 41/00* (2022.01)
*H04L 41/12* (2022.01)
(Continued)

(52) U.S. Cl.
CPC ......... *H04W 28/0247* (2013.01); *H04L 41/12* (2013.01); *H04L 41/24* (2013.01); *H04L 43/0829* (2013.01); *H04L 43/0847* (2013.01); *H04L 43/12* (2013.01); *H04L 43/16* (2013.01); *H04L 45/02* (2013.01); *H04L 45/306* (2013.01);
(Continued)

(58) Field of Classification Search
CPC ..... H04L 41/02–5096; H04L 43/02–55; H04L 45/02–851; H04L 47/10–83; H04L 69/02–40; H04W 24/02–10; H04W 28/02–26; H04W 40/005–38; H04W 76/10–50
See application file for complete search history.

(56) References Cited

U.S. PATENT DOCUMENTS

2011/0246833 A1* 10/2011 Bockhaus ............... H04L 43/16
2015/0381406 A1* 12/2015 Francois ................. H04L 45/28
(Continued)

FOREIGN PATENT DOCUMENTS

EP          3338415 A1    6/2018
WO     2021047321 A1    3/2021

OTHER PUBLICATIONS

International Search Report and Written Opinion for International Application No. PCT/US2023/029682, mailed Oct. 17, 2023, 12 Pages.
(Continued)

*Primary Examiner* — Timothy J Weidner
(74) *Attorney, Agent, or Firm* — Baker Botts L.L.P.

(57) ABSTRACT

A system of one embodiment provides reverse affinity link exclusion for a computer network. The system includes a memory and a processor. The memory is operable to store logical transmission links, logical receiving links, and metrics for data packets of nodes. The system determines a threshold value for node link reliability. The system determines the node link reliability of a receiving node link by evaluating data loss associated with one or more incoming data packets. The system compares the node link reliability to the threshold value. The system identifies the receiving node link when the node link reliability exceeds the threshold value. The system communicates the identified receiving node link to one or more nodes.

17 Claims, 4 Drawing Sheets

(51) Int. Cl.
| | |
|---|---|
| *H04L 43/0823* | (2022.01) |
| *H04L 43/0829* | (2022.01) |
| *H04L 43/12* | (2022.01) |
| *H04L 43/16* | (2022.01) |
| *H04L 45/02* | (2022.01) |
| *H04L 45/302* | (2022.01) |
| *H04L 47/12* | (2022.01) |
| *H04L 47/2475* | (2022.01) |
| *H04W 24/08* | (2009.01) |
| *H04W 24/10* | (2009.01) |
| *H04W 28/02* | (2009.01) |
| *H04W 28/04* | (2009.01) |
| *H04W 28/08* | (2023.01) |
| *H04W 40/02* | (2009.01) |
| *H04W 40/24* | (2009.01) |

(52) U.S. Cl.
CPC .......... *H04L 47/12* (2013.01); *H04L 47/2475* (2013.01); *H04W 24/08* (2013.01); *H04W 24/10* (2013.01); *H04W 28/0236* (2013.01); *H04W 28/0284* (2013.01); *H04W 28/04* (2013.01); *H04W 28/0958* (2020.05); *H04W 28/0992* (2020.05); *H04W 40/02* (2013.01); *H04W 40/24* (2013.01)

(56) References Cited

U.S. PATENT DOCUMENTS

| | | | |
|---|---|---|---|
| 2016/0374136 | A1* | 12/2016 | Moisio .............. H04W 28/0236 |
| 2020/0036573 | A1 | 1/2020 | Kim et al. |
| 2020/0244588 | A1 | 7/2020 | Filsfils et al. |
| 2020/0287800 | A1 | 9/2020 | Xu et al. |
| 2021/0083940 | A1 | 3/2021 | Peng et al. |
| 2022/0006721 | A1 | 1/2022 | Negi et al. |

OTHER PUBLICATIONS

Network Working Group, Internet-Draft, Intended status: Standards Track, Expires: Nov. 19, 2022, title "IGP Flexible Algorithm draft-ietf-lsr-flex-algo-20," P. Psenak et al.

* cited by examiner

SYSTEMS AND METHODS FOR REVERSE AFFINITY LINK EXCLUSION FOR ULTRA-RELIABLE LOW LATENCY COMMUNICATION

TECHNICAL FIELD

The present disclosure relates generally to communication networks, and more specifically to systems and methods for reverse affinity link exclusion for ultra-reliable low latency communication.

BACKGROUND

Segment-routing (SR) is a technology that greatly simplifies network operations and makes networks Software Defined Network (SDN)-friendly. SR is applicable to data-planes such as the Multiprotocol Label Switching (MPLS) (typically referred to as 'SR-MPLS') data-plane and the Internet Protocol version 6 (IPv6) (typically referred to as 'SRO') data-plane. Furthermore, SR technology is to be used with network slicing to provide services in 3rd Generation Partnership Project (3GPP) 5th Generation (5G) networks. For the new 5G networks, service providers are planning to deliver Ultra-Reliable Low-Latency Communication (URLLC) services. These types of services should be using low latency links. The sensitivity for the error rate of URLLC traffic is much higher compared to the rest of traffic.

BRIEF DESCRIPTION OF THE DRAWINGS

For a more complete understanding of the present disclosure and for further features and advantages thereof, reference is now made to the following description taken in conjunction with the accompanying drawings, in which.

DESCRIPTION OF EXAMPLE EMBODIMENTS

Overview

Figure 1:
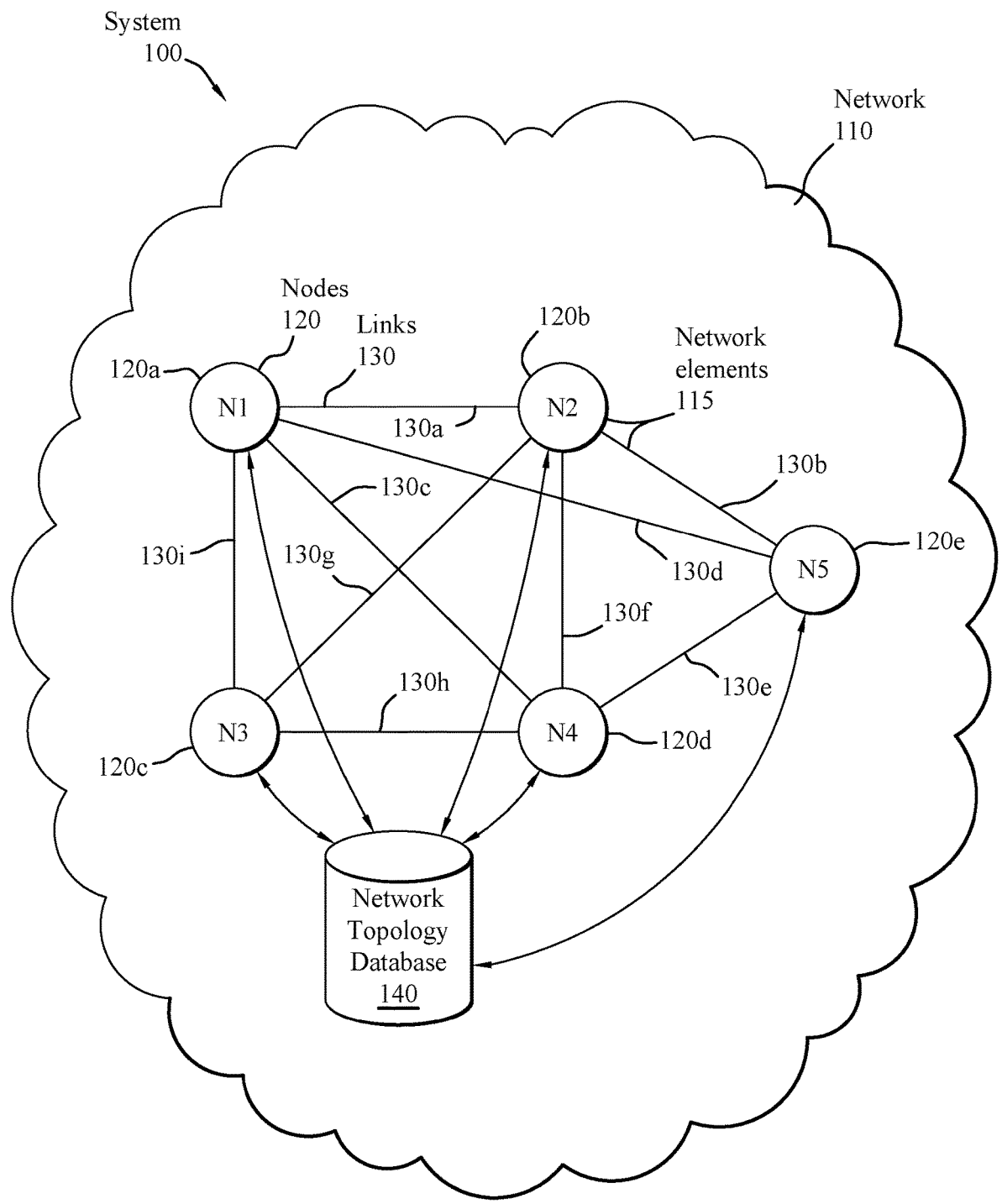
FIG. 1 illustrates an example computer network that provides reverse affinity link exclusion, according to some embodiments of the present disclosure.

According to one embodiment of the present disclosure, a system provides reverse affinity link exclusion for a computer network. The system includes a memory and a processor. The memory is configured to store logical transmission links, logical receiving links, and metrics for data packets of nodes. The system determines a threshold value for node link reliability. The system determines the node link reliability of a receiving node link by evaluating data loss associated with one or more incoming data packets. The system compares the node link reliability to the threshold value. The system identifies the receiving node link when the node link reliability exceeds the threshold value. The system communicates the identified receiving node link to one or more nodes in the computer network.

According to one embodiment of the present disclosure, a method provides reverse affinity link exclusion for a computer network. The method includes storing logical transmission links, logical receiving links, and metrics for data packets of nodes. The method determines a threshold value for node link reliability. The method determines the node link reliability of a receiving node link by evaluating data loss associated with one or more incoming data packets. The method compares the node link reliability to the threshold value. The method identifies the receiving node link when the node link reliability exceeds the threshold value. The method communicates the identified receiving node link to one or more nodes in the computer network.

Certain embodiments of the disclosure may provide one or more technical advantages. A technical advantage of one embodiment may include allowing for Ultra-Reliable Low-Latency Communication (URLLC) services in 5G networks by automatically excluding an identified node link from Interior Gateway Protocol Flexible Algorithms (IGP Flex-Algo) or Segment-Routing Traffic-Engineering (SRTE) topology based on the node link's reliability in reverse. One or more other technical advantages may be readily apparent to one skilled in the art from the figures, descriptions, and claims included herein.

EXAMPLE EMBODIMENTS

This disclosure describes systems and methods for reverse affinity link exclusion for a computer network. SR policies as defined in Internet Engineering Task Force (IETF) Segment Routing Policy for Traffic Engineering publication, available at "tools.ietf.org/html/draft-filsfils-spring-segment-routing-policy," are used to steer traffic through a specific, user-defined path using segment lists, which consist of Segment Identifiers (SIDs), for traffic engineering (TE) purposes. Segment lists can be carried in a label stack of Multiprotocol Label Switching (MPLS) labels for SR-MPLS data packets or in IPv6 addresses for SR over IPv6 (SRv6) data packets. Traffic flows through these paths are expected to satisfy certain constraints (e.g., end-to-end delay constraints, packet loss constraints, etc.) as may be defined in customer Service Level Agreements (SLAs). For example, services such as tele-medicine, on-line gaming, stock market trading, autonomous connected cars, and many mission critical applications have strict end-to-end delay bounds. Furthermore, SR technologies can be used with network slicing to provide end-to-end low latency services in 3rd Generation Partnership Project (3GPP) 5th Generation (5G) networks. These Ultra-Reliable Low-Latency Communication (URLLC) services are typically provisioned by the usage of a IGP Flex-Algo or Segment-Routing Traffic-Engineering (SRTE) topology. These typically are provisioned by the usage of Flex-Algo that uses the measured latency as a metric into its topology calculation. Alternatively, it is provisioned by the means of using a SRTE topology that utilizes a delay metric for its path calculations. However, neither of these take the input error rate into consideration.

The present disclosure describes embodiments that are directed to providing a solution to the above problems by automatically excluding an identified node link from IGP Flex-Algo or Segment-Routing Traffic-Engineering (SRTE) topology based on the node link's reliability of incoming traffic. The present disclosure provides systems and methods that allow for link reliability to be derived from CRC errors, packet loss, or FEC correction counters in the reverse direction. Because these values are not currently advertised and not available for path calculation, the present disclosure allows for faster and better metrics for a Flex-Algo or SRTE to determine link reliability. Therefore, unreliable links may be excluded more effectively in URLLC networks.

FIG. 1 is an illustration of an example computer network 100 that provides for reverse affinity link exclusion for a computer network. The components of system 100 may include any suitable combination of hardware, firmware, and software. System 100 of FIG. 1 includes a network 110, network elements 115, and network topology database 140.

Network 110 of system 100 is any type of network that facilitates communication between components of system 100. Network 110 may connect one or more components of system 100. This disclosure contemplates any suitable network. For example, one or more portions of network 110 may include an ad-hoc network, an intranet, an extranet, a VPN, a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a combination of two or more of these, or other suitable types of networks. Network 110 may include one or more networks. Network 110 may be any communications network, such as a private network, a public network, a connection through Internet, a mobile network, a WI-FI network, etc. One or more components of system 100 may communicate over network 110. Network 110 may include a core network (e.g., the Internet), an access network of a service provider, an Internet service provider (ISP) network, and the like.

Network elements 115 of system 100 are hardware, software, and protocols associated with network 110. Network elements 115 constitute the infrastructure of network 110. Network elements 115 include nodes 120. Nodes 120 receive, create, store and/or send data along a path of network 110. Nodes 120 may include one or more endpoints and/or one or more redistribution points that recognize, process, and forward data to other nodes 120. Nodes 120 may include virtual and/or physical network nodes. In certain embodiments, one or more nodes 120 include one or more virtual machines, hardware devices, bare metal servers, data communications equipment such as computers, routers, servers, printers, workstations, switches, bridges, modems, hubs, and the like. In some embodiments, one or more nodes 120 include data terminal equipment such as routers, servers, printers, workstations, and the like. In certain embodiments, nodes use static and/or dynamic routing to send data to and/or receive data to other nodes of system 100. Nodes 120 of system 100 include nodes 120a, 120b, 120c, 120d, and 120e.

Network elements 115 of system 100 include links 130. Links 130 are the physical and logical network components used to interconnect nodes 120. Links 130 of system 100 include links 130a, 130b, 130c, 130d, 130e, 130f, 130g, 130h, and 130i. Link 130a connects node 120a with node 120b, link 130b connects node 120b with node 120e, link 130c connects node 120a with node 120d, link 130d connects node 120a with node 120e, link 130e connects node 120d with node 120e, link 130f connects node 120b with node 120d, link 130g connects node 120b with node 120c, link 130h connects node 120c with node 120d, and link 130i connects node 120a with node 120c. Network elements 115 of system 100 may include prefixes. The prefixes may be advertised with prefix-segment IDs (SIDs) that are used to steer packets along constraint-based paths of network 110. Each SID may represent a path that is computed according to an identified flexible algorithm.

Network topology database 140 represents any suitable device for maintaining all the information necessary for routing traffic through nodes 120 in network 110, all the information about the nodes 120, and links 130 connected to the nodes. Network topology database 140 may include one or more processors, memory, and storage. In certain embodiments, network topology database 140 may be part of a network controller. In certain embodiments, network topology database 140 may be one or more nodes 120 in network 110. The network topology information in network topology database 140 is updated when new links 130 are activated, new nodes 120 are added to the network, when links 130 or nodes 120 are dropped, or when link loads change significantly. Such information is exchanged by means of control messages with all other Route Controllers to provide the up-to-date topological information needed for path selection (such database updates are carried on packets very similar to the data packets exchanged between end users of the network). The fact that the network topology is kept current in every node through continuous updates allows dynamic network reconfigurations without disrupting end users logical connections (sessions). In certain embodiments, network topology database stores the segment identifiers for each link 130 in network 110. In certain embodiments, network topology database 140 is communicatively coupled to one or more nodes in network 110. In certain embodiments, network topology database 140 may store reverse link affinity reliability indicator for each link 130 in network 110. The reverse link affinity reliability indicator stored in network topology database 140 may include an affinity bit or any other suitable indicator that the link 130 that it represents is an unreliable link in network 110. In certain embodiments, Flex-Algo may use the reverse link affinity reliability indicator to update routing and path calculations for traffic passing through network 110. For example, if Flex-Algo accesses network topology database 140 when determining routing paths through network 110 and determines that link 130b has a reverse link affinity reliability indicator of "RED," then Flex-Algo will avoid routing traffic through a path that goes through link 130b.

In an exemplary embodiment of operation, each node 120 of system 100 may have instructions to send a packet to another node 120. Each node 120 may have several options for routing traffic through network 110. For example, node 120a may send the packet to node 120b via link 130a with instructions for node 120b to send the packet to node 120c via link 130g. As another example, node 120a may send the packet to node 120d via link 130c with instructions to send the packet to node 120c via link 130h. While both routes may be equally valid routes in a typical system, system 100 of FIG. 1 determines the data transmission route using Flex-Algo that has been extended to provide for reverse affinity link exclusion.

Modifications, additions, or omissions may be made to system 100 without departing from the scope of the disclosure. Although system 100 of FIG. 1 describes and illustrates particular network elements 115 performing particular actions, this disclosure contemplates any suitable network element 115 or combination thereof performing any suitable action. For example, node 120c may perform one or more actions described above for system 100. As another example, a network controller may perform one or more actions described above for system 100. Although FIG. 1 illustrates a particular number of networks 110 and network elements 115, this disclosure contemplates any suitable number of networks 110 and network elements 115. For example, network 110 may include more or less than five nodes 120 and/or nine links 130. Although FIG. 1 illustrates a particular arrangement of network 110 and network elements 115, this disclosure contemplates any suitable arrangement of network 110 and network elements 115.

Figure 2:
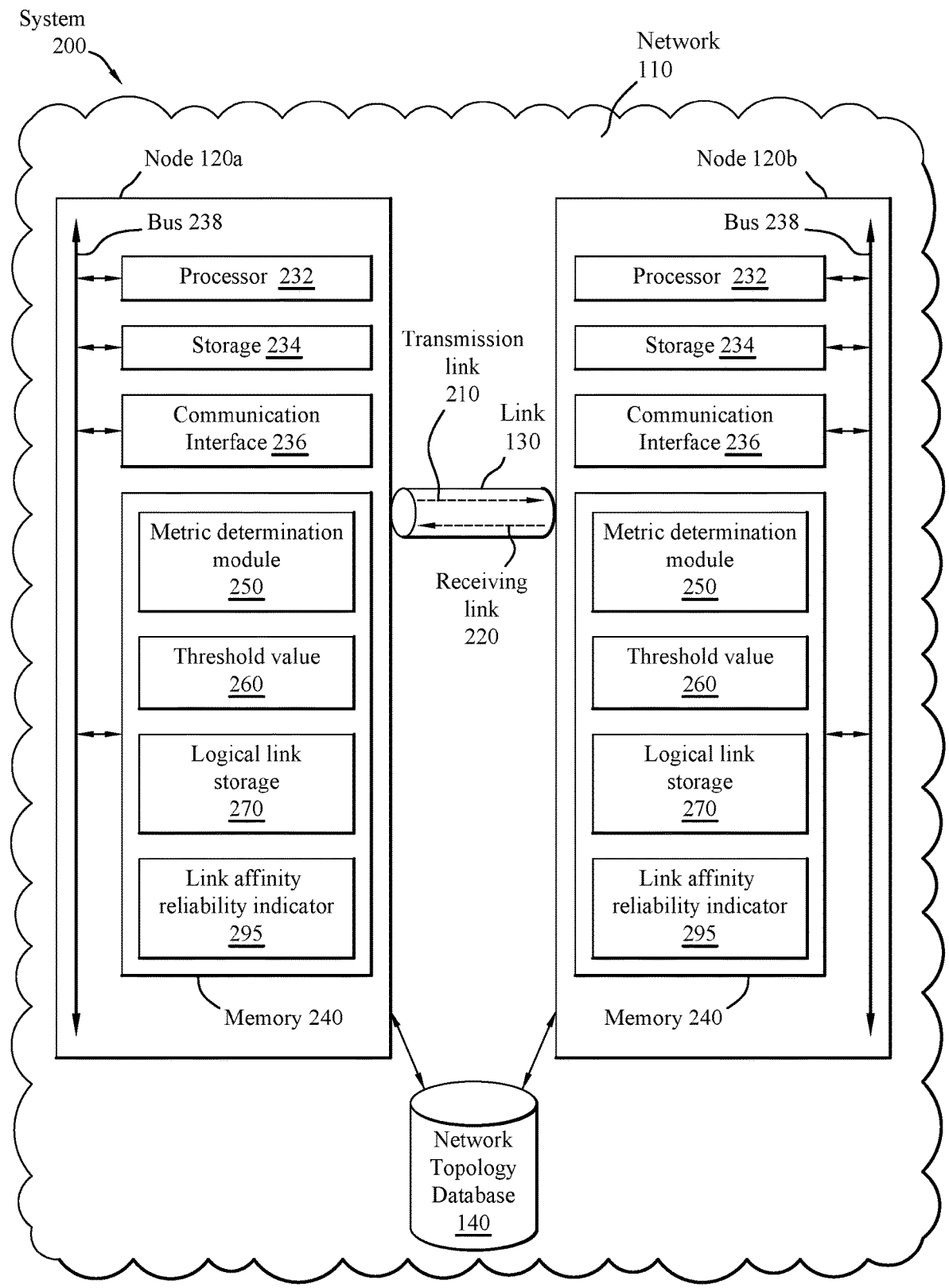
FIG. 2 illustrates the computer network of FIG. 1 in greater detail, according to one embodiment of the present disclosure.

FIG. 2 illustrates network 110 in greater detail, according to one embodiment of the present disclosure. In the illustrated embodiment, system 200 includes network 110. In the illustrated embodiment, Network 110 includes nodes 120a and 120b. Further according to the illustrated embodiment, nodes 120a and 120b are communicatively coupled by link 130. As shown in FIG. 2, node 120 includes a processor 232, storage 234, communication interface 236, and memory 240. In the illustrated embodiment, processor 232, storage 234, communication interface 236, and memory 240 are coupled to data bus 238. In certain embodiments, memory 240 may include a metric determination module 250, a threshold value 260, logical link storage 270, and a link affinity reliability indicator 295. According to the illustrated embodiment, link 130 includes a transmission link 210 and a receiving link 220.

Processor 232 represents any suitable hardware for executing instructions, such as those making up a computer program or the various modules contained on memory 240. As an example and not by way of limitation, to execute instructions, processor 232 may retrieve (or fetch) the instructions from an internal register, an internal cache, memory 240, or storage 234; decode and execute them; and then write one or more results to an internal register, an internal cache, memory 240, or storage 234. In particular embodiments, processor 232 may include one or more internal caches for data, instructions, or addresses. This disclosure contemplates processor 232 including any suitable number of any suitable internal caches, where appropriate. As an example and not by way of limitation, processor 232 may include one or more instruction caches, one or more data caches, and one or more translation lookaside buffers (TLBs). Instructions in the instruction caches may be copies of instructions in memory 240 or storage 234, and the instruction caches may speed up retrieval of those instructions by processor 232. Data in the data caches may be copies of data in memory 240 or storage 234 for instructions executing at processor 232 to operate on; the results of previous instructions executed at processor 232 for access by subsequent instructions executing at processor 232 or for writing to memory 240 or storage 234; or other suitable data. The data caches may speed up read or write operations by processor 232. The TLBs may speed up virtual-address translation for processor 232. In particular embodiments, processor 232 may include one or more internal registers for data, instructions, or addresses. This disclosure contemplates processor 232 including any suitable number of any suitable internal registers, where appropriate. Where appropriate, processor 232 may include one or more arithmetic logic units (ALUs); be a multi-core processor; or include one or more processors 232. Although this disclosure describes and illustrates a particular processor, this disclosure contemplates any suitable processor.

Memory 240 includes main memory for storing instructions for processor 232 to execute or data on which processor 232 operates. As an example and not by way of limitation, computer system 200 may load instructions from storage 234 or another source (such as, for example, another computer system 200) to memory 240. Processor 232 may then load the instructions from memory 240 to an internal register or internal cache. To execute the instructions, processor 232 may retrieve the instructions from the internal register or internal cache and decode them. During or after execution of the instructions, processor 232 may write one or more results (which may be intermediate or final results) to the internal register or internal cache. Processor 232 may then write one or more of those results to memory 240. In particular embodiments, processor 232 executes only instructions in one or more internal registers or internal caches or in memory 240 (as opposed to storage 234 or elsewhere) and operates only on data in one or more internal registers or internal caches or in memory 240 (as opposed to storage 234 or elsewhere). One or more memory buses (which may each include an address bus and a data bus) may couple processor 232 to memory 240. Bus 238 may include one or more memory buses, as described below. In particular embodiments, one or more memory management units (MMUs) reside between processor 232 and memory 240 and facilitate accesses to memory 240 requested by processor 232. In particular embodiments, memory 240 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 240 may include one or more memories 240, where appropriate. Although this disclosure describes and illustrates particular memory, this disclosure contemplates any suitable memory.

In particular embodiments, storage 234 includes mass storage for data or instructions. As an example and not by way of limitation, storage 234 may include a hard disk drive (HDD), a floppy disk drive, flash memory, an optical disc, a magneto-optical disc, magnetic tape, or a Universal Serial Bus (USB) drive or a combination of two or more of these. Storage 234 may include removable or non-removable (or fixed) media, where appropriate. Storage 234 may be internal or external to computer system 200, where appropriate. In particular embodiments, storage 234 is non-volatile, solid-state memory. In particular embodiments, storage 234 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 234 taking any suitable physical form. Storage 234 may include one or more storage control units facilitating communication between processor 232 and storage 234, where appropriate. Where appropriate, storage 234 may include one or more storages 234. Although this disclosure describes and illustrates particular storage, this disclosure contemplates any suitable storage.

In particular embodiments, communication interface 236 includes hardware, software, or both providing one or more interfaces for communication (such as, for example, packet-based communication) between computer system 200 and one or more other computer system 200 or one or more networks. As an example and not by way of limitation, communication interface 236 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 236 for it. As an example and not by way of limitation, computer system 200 may communicate with an ad hoc network, a personal area network (PAN), a LAN, a WAN, a metropolitan area network (MAN), or one or more portions of the Internet or a combination of two or more of these. One or more portions of one or more of these networks may be wired or wireless. As an example, computer system 200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. System 100 may include any suitable communication interface 236 for any of these networks, where appropriate. In certain embodiments, communication interface 236 enables node 120a to communicate to node 120b over link 130. In certain embodiments, communication interface 236a transmits packets over transmission link 210 to communication interface 236b in node 120b. In certain embodiments, communication interface 236b may receive packets that were transmitted by another node 120 in network 110. In certain embodiments, communication interface 236b may transmit packets to node 120a over receiving link 220. Communication interface 236 may include one or more communication interfaces 236, where appropriate. Although this disclosure describes and illustrates a particular communication interface, this disclosure contemplates any suitable communication interface.

In particular embodiments, bus 238 includes hardware, software, or both coupling components of computer system 200 to each other. As an example and not by way of limitation, bus 238 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association Local Bus (VLB), or another suitable bus or a combination of two or more of these. Bus 238 may include one or more buses 238, where appropriate. Although this disclosure describes and illustrates a particular bus, this disclosure contemplates any suitable bus or interconnect.

Metric determination module 250 represents any suitable set of machine-readable computer instructions that are capable of determining various metrics associated with the reliability of link 130 in network 110. In certain embodiments, metric determination module determines the metrics regarding packet loss. Packet loss is losing packets along the data path. In certain embodiments, packet loss may be determined by measuring the number of packets not received that were expected to be received by a receiving node 120, such as node 120b. In certain embodiments, the metric regarding packet loss is the packet loss rate which is equal to the number of packets not received by the receiving node divided by the total number of packets sent. In some embodiments, in order for metric determination module 250 to calculate the packet loss, node 120a would send an expected number of packets to be sent to receiving node 120b. Then metric determination module 250 would count the number of received packets that were actually received by node 120b from node 120a. The total packet loss would be the expected number of packets minus the number of received packets.

In certain embodiments, metric determination module 250 determines the metrics regarding cyclical redundancy check (CRC) errors. CRC is a data-integrity check value that may be used to verify that the contents of a data packets sent over network 110 were not altered in transit. Typically, a conventional 5-tuple is used to classify an IP packet's data flow over network 110. By way of example, consider a data packet. The packet includes a data-link header, IP header, transport header, application header(s), payload data and a cyclic redundancy check (CRC). The CRC portion of the data packet is calculated when the packet is sent and the value of the CRC is based on the remainder of a polynomial division of contents of the packet. When the receiving node 120 receives the data packet, it is able to perform the same polynomial division of the contents of the packet and, in the event that the CRC check values do not match, the receiving node 120 will know that the packet is corrupt, and that data has been lost over link 130. In certain embodiments, metric determination module performs the above CRC check analysis and will count the number of CRC errors that have occurred corresponding to each link 130 coupled to node 120.

In certain embodiments, metric determination module 250 determines the metrics regarding Forward Error Correction (FEC) correction. FEC is a technique used to recover lost packets on a network link. FEC may send extra "parity" packets for every group (N) of packets. As long as the receiving network node 120 receives a subset of packets in the group (e.g., N−1) and the parity packet, a lost packet in the group can be recovered. FEC aims to improve end-to-end network performance by avoiding retransmissions from the sending network node. In certain embodiments, metric determination module 250 may perform the FEC correction. In certain embodiments, metric determination module 250 counts the number of times that any device in a receiving node 120 in network 110 has had to perform FEC correction on an incoming data packet.

Threshold value 260 represents any suitable data format of a value of the level by which data is lost over a link 130. Threshold value 260 may be compared to a metric as determined by metric determination module 250 to determine whether to exclude a link 130 in network 110. Threshold value 260 may include integer values, decimal values, strings, or any other data format. In certain embodiments, node 120 may include multiple threshold values 260 each corresponding to a metric that metric determination module 250 calculates. For example, threshold value 260 may be an integer value of 5 where if the metric determination module 250 determines that a receiving node 120 has performed FEC 6 times, then system 200 will exclude a link 130. As another example, threshold value 260 may be a percentage value of 2%, wherein if the metric determination module 250 determines that the packet loss rate over a link 130 is 3%, then system 200 will exclude the link 130.

Logical link storage 270 represents any suitable data format of storing the various links 130 that are connected to a node 120 in network 110. Logical link storage 270 may include integer values, decimal values, strings, or any other data format. For example, in the illustrated embodiment, logical link storage 270b of node 120b would include a value that indicates that it is connected to node 120a via link 130. Logical link storage 270 may store logical receiving links and logical transmission links.

Link affinity reliability indicator 295 represents any suitable set of machine-readable computer instructions that can be executed by processor 232 that allow for node 120 to set link affinity reliability indicator value on a receiving link 220 in the case that the value received by the metric determination module 250 exceeds threshold value 260. In certain embodiments, link affinity reliability indicator 295 may receive a metric determination from metric determination module 250. In certain embodiments, link affinity reliability indicator 295 compares the metric determination with threshold value 260, and if the metric determination exceeds threshold value 260, link affinity reliability indicator 295 sets the link affinity reliability indicator value on a receiving link 220 to "RED." However, if the metric determination does not exceed the threshold value 260, in certain embodiments, the link affinity reliability indicator 295 does not do anything. In certain embodiments, Link affinity reliability indicator 295 may communicate to other nodes 120 in network 110 that a certain link 130 is an unreliable link. In certain embodiments, the link affinity reliability indicator 295 communicates to a controller in network 110 that a certain link 130 is an unreliable link. In certain embodiments, link affinity reliability indicator 295 may automatically determine that the metric determination exceeds threshold value 260. In certain embodiments, if the link affinity reliability indicator 295 determines that the metric determination exceeds threshold value 260, then IGP (ISIS, OSPF) is notified, and IGP sets the affinity RED on the receiving link 220.

In certain embodiments, link affinity reliability indicator 295 may communicate to network topology database 140 in network 110 that a certain link 130 is an unreliable link. For example, network topology database 140 may then a store reverse link affinity reliability indicator for each link 130 in network 110 that it receives from link affinity reliability indicator 295. The reverse link affinity reliability indicator stored in network topology database 140 may include an affinity bit or any other suitable indicator that the link 130 that it represents is an unreliable link in network 110. In certain embodiments, Flex-Algo may use the reverse link affinity reliability indicator to update routing and path calculations for traffic passing through network 110. For example, if Flex-Algo accesses network topology database 140 when determining routing paths through network 110 and determines that link 130*b* has a reverse link affinity reliability indicator of "RED," then Flex-Algo will avoid routing traffic through a path that goes through link 130*b*.

Transmission link 210 represents any suitable link 130 that transmits packets from a first node 120*a* to a second node 120*b*. Links 130 are the physical and logical network components used to interconnect nodes 120.

Receiving link 220 represents any suitable link 130 that transmits packets from a second node 120*b* to a first node 120*a* in response to a first node 120*a* transmitting a packet to second node 120*b*. Links 130 are the physical and logical network components used to interconnect nodes 120. In certain embodiments, an operator of system 200 may reserve a specific affinity bit for traffic on network 110. In certain embodiments, the affinity bit that is reserved on the receiving link is the link affinity reliability indicator value. In certain embodiments, if the affinity bit is set, then an operator can set the Flex-Algo topology to exclude any links 130 where the affinity bit on receiving link 220 has been set to "RED." In certain embodiments, the affinity bit can include a bit value, or a string value, or any other suitable value capable of conveying to the Flex-Algo to exclude a link 130 in its network topology.

In an exemplary embodiment of operation, an operator of network 110 defines that a metric determination module 250 will use a FEC correction counter metric. Then operator sets the threshold value 260 to a value of 10. Then operator reserves a specific affinity bit for all links 130 in network 110. Then node 120*a* transmits one or more packets via communication interface 236*a* and through transmission link 210 in link 130 to communication interface 236*b* at node 120*b*. Metric determination module 250 automatically counts the number of times that node 120*b* performs FEC correction on incoming packets of data. Link affinity reliability indicator 295 automatically compares the metric determination with the threshold value 260. Once the metric determination exceeds the threshold value 260, link affinity reliability indicator 295 sets the affinity link on receiving link 220 to "RED." In certain embodiments, link affinity reliability indicator 295 communicates that link 130 to each node in network 110 as being an unreliable link. In certain embodiments, each node 120 in network 110 may store link 130 in their logical link storage 270 or in their storage 234 so that it knows not to communicate via link 130. In certain embodiments, IGP is notified that link 130 is unreliable and also sets the affinity bit on receiving link 220. Accordingly, in some embodiments, a new Flex-Algo Definition (FAD) constraints is defined to be that the reverse flexible algorithm excludes affinity "RED." Accordingly, in certain embodiments, because the affinity bit on receiving link 220 has been set to RED, node 120*a* will exclude transmitting packets over transmission link 210.

Modifications, additions, or omissions may be made to system 200 without departing from the scope of the disclosure. For example, the above disclosures discuss using Flex-Algo, but it can also be used by SRTE when calculating a path for URLLC traffic. As another example, while the metric determination module 250 and the link affinity reliability indicator 295 are discussed as being separate instructions in memory 240, in certain embodiments they may be combined into one or more sets of instructions. Moreover, in certain embodiments, metric determination module 250 may perform the same functions as the link affinity reliability indicator 295.

Figure 3:
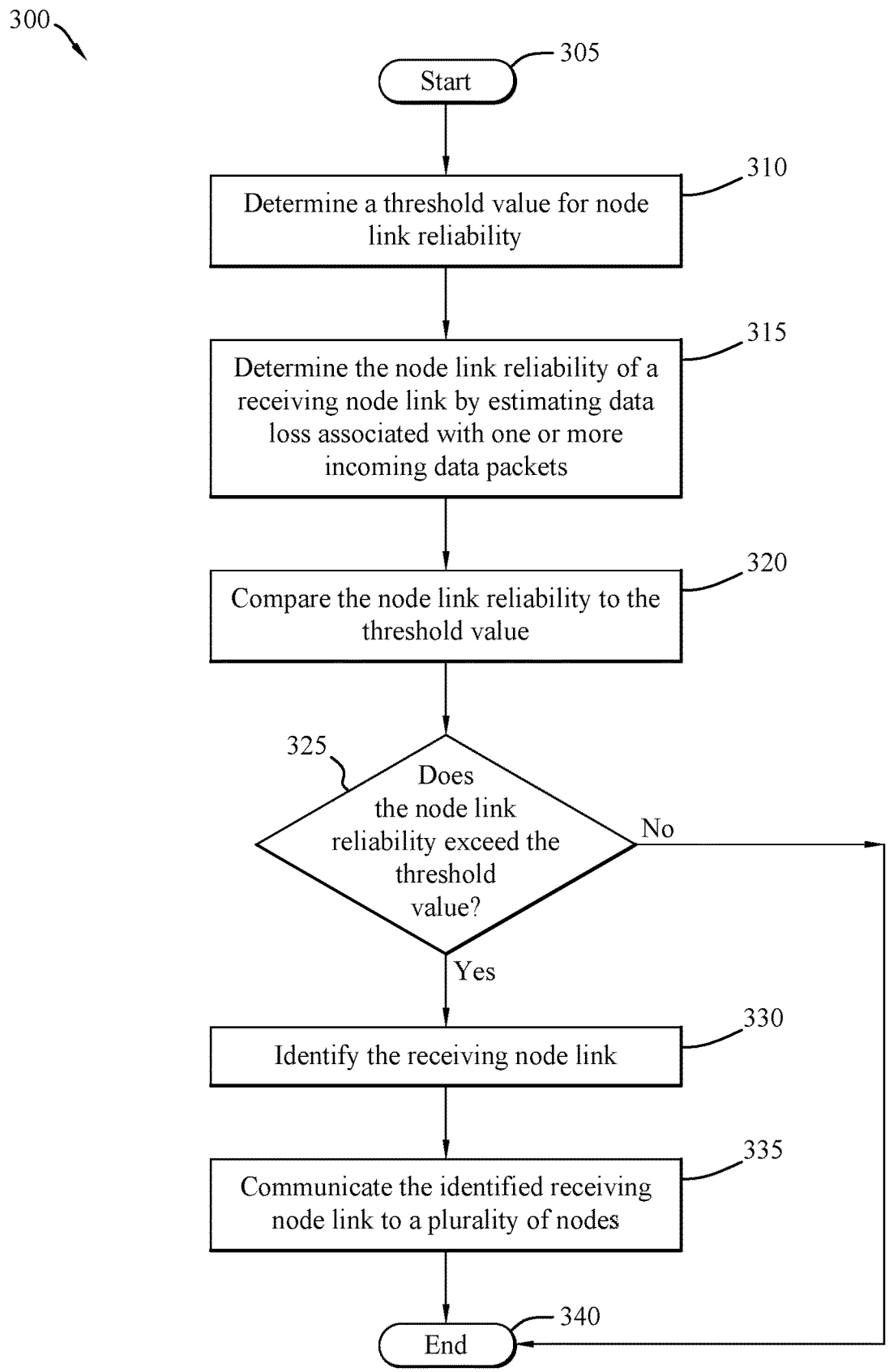
FIG. 3 illustrates an example method for providing reverse affinity link exclusion in a computer network, according to some embodiments of the present disclosure.

FIG. 3 illustrates an example method for reverse affinity link exclusion for a computer network, according to some embodiments of the present disclosure.

At step 305, method 300 begins. At step 310, method 300 determines a threshold value for node link reliability. In some embodiments, method 300 determines a threshold value for node link reliability by having an operator of network 110 set threshold value 260 to a particular value corresponding to the metric calculated by the metric determination module 250. For example, at step 310, operator of network 110 may set threshold value 260 to the value of 10 FEC corrections occurred if the metric determination module 250 is calculating the number of times node 120*a* has had to perform FEC correction. An operator may include a user of network 110, a user of a node 120, or any other suitable user of network 110. In some embodiments, method 300 determines a threshold value for node link reliability automatically based on the metrics that are being observed by metric determination module 250. For example, at step 310, metric determination module 250 may automatically determine a threshold value based on the type of metric that it is determining. For example, if the metric determination module 250 is determining the number of FEC corrections, then the metric determination module 250 may automatically set the threshold value to 10 FEC corrections.

At step 315, method 300 determines the node link reliability of a receiving node link by estimating data loss associated with one or more incoming data packets. In some embodiments, at step 315 metric determination module 250 determines the node link reliability of a receiving node link by estimating the data loss associated with one or more incoming data packets. In certain embodiments, data loss may be determined by measuring the number of packets not received that were expected to be received by a receiving node 120, such as node 120*b*. In certain embodiments, the metric regarding packet loss is the packet loss rate which is equal to the number of packets not received by the receiving node divided by the total number of packets sent. In some embodiments, in order for metric determination module 250 to calculate the packet loss, node 120*a* would send an expected number of packets to be sent to receiving node 120*b*. Then metric determination module 250 would count the number of received packets that were actually received by node 120*b* from node 120*a*. The total packet loss would be the expected number of packets minus the number of received packets. In certain embodiments, metric determination module 250 estimates data loss by performing a CRC check of incoming data packets communicated through a receiving node link. In certain embodiments, at step 315 metric determination module 250 generates a node link reliability value after it has estimated the data loss. This value may be compared to the threshold value 260.

At step 320, method 300 compares the node link reliability to the threshold value. In certain embodiments, link affinity reliability indicator 295 may receive a metric determination from metric determination module 250. In certain embodiments, link affinity reliability indicator 295 compares the metric determination with threshold value 260. In certain embodiments, metric determination module 250 compares the metric determination with threshold value 260.

At step 325, method 300 makes a decision whether the node link reliability (that was determined at step 315 and compared at step 320) exceeds the threshold value 260. In certain embodiments, if the node link reliability exceeds the threshold value 260, then method 300 proceeds to step 330. In certain embodiments, if the node link reliability does not exceed the threshold value, then method 300 proceeds to step 340 where it ends.

At step 330, method 300 identifies the receiving node link. In certain embodiments, link affinity reliability indicator 295 may receive an identification of the receiving node link from metric determination module 250. In some embodiments, link affinity reliability indicator 295 accesses logical link storage 270 to obtain the link 130 that is the receiving node link.

At step 335, method 300 communicates the identified receiving node link to a plurality of nodes. In certain embodiments, link affinity reliability indicator 295 may communicate to other nodes 120 in network 110 that a certain link 130 is an unreliable link. In certain embodiments, the link affinity reliability indicator 295 communicates to a controller in network 110 that a certain link 130 is an unreliable link. In certain embodiments, if the link affinity reliability indicator 295 determines that the metric determination exceeds threshold value 260, then IGP (ISIS, OSPF) is notified and IGP sets the affinity RED on the receiving link 220. In certain embodiments, if the link affinity reliability indicator 295 determines that the metric determination exceeds threshold value 260, link affinity reliability indicator 295 will communicate to network topology database 140 the corresponding link 130 is an unreliable link and may set an affinity bit to RED.

At step 340, method 300 may end. In some embodiments, method 300 may then proceed to additional steps according to the present disclosure.

Various embodiments may perform some, all, or none of the steps described above. For example, certain embodiments may omit steps 320 under certain conditions. Furthermore, certain embodiments may perform these steps in a different order or in parallel. Moreover, one or more steps may be repeated. For example, steps 315-335 may be repeated for any number of receiving node links or links 130. While discussed as metric determination module 250, link affinity reliability indicator 295, and node 120*b* as performing the steps of this method, any suitable component of network 110 may perform one or more steps of the method.

Figure 4:
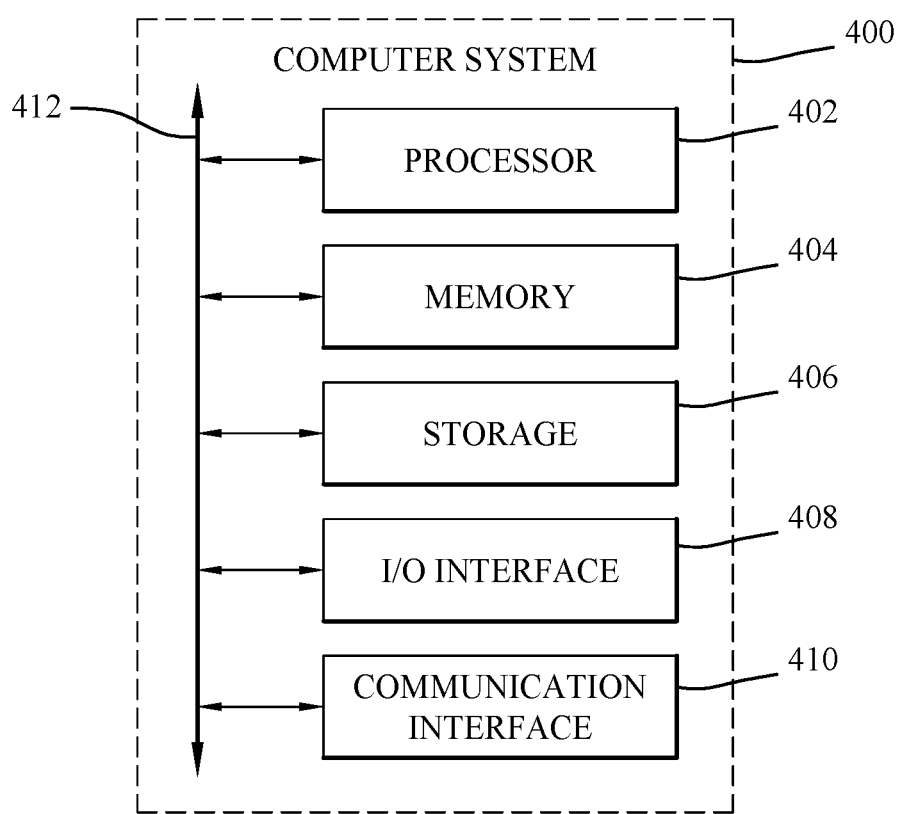
FIG. 4 illustrates an example computer system that may be used by the systems and methods described herein.

FIG. 4 illustrates an example computer system 400. In particular embodiments, one or more computer system 400 perform one or more steps of one or more methods described or illustrated herein. In particular embodiments, one or more computer system 400 provide functionality described or illustrated herein. In particular embodiments, software running on one or more computer system 400 performs one or more steps of one or more methods described or illustrated herein or provides functionality described or illustrated herein. Particular embodiments include one or more portions of one or more computer system 400. Herein, reference to a computer system may encompass a computing device, and vice versa, where appropriate. Moreover, reference to a computer system may encompass one or more computer systems, where appropriate.

This disclosure contemplates any suitable number of computer system 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer system 400; be unitary or distributed; span multiple locations; span multiple machines; span multiple data centers; or reside in a cloud, which may include one or more cloud components in one or more networks. Where appropriate, one or more computer system 400 may perform without substantial spatial or temporal limitation one or more steps of one or more methods described or illustrated herein. As an example and not by way of limitation, one or more computer system 400 may perform in real time or in batch mode one or more steps of one or more methods described or illustrated herein. One or more computer system 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer system 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODD s), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system, comprising:
    a memory configured to store logical transmission links, logical receiving links, and metrics for data packets of nodes; and
    a processor communicatively coupled to the memory and configured to:
        determine a threshold value for node link reliability;
        determine the node link reliability of a receiving node link by evaluating data loss associated with one or more incoming data packets;
        compare the node link reliability to the threshold value;
        determine one or more metrics for incoming ultra-reliable low latency communications (URLLC) data packets;
        communicate the one or more determined metrics;
        identify the receiving node link when the node link reliability exceeds the threshold value; and
        communicate the identified receiving node link to a plurality of nodes.

2. The system of claim 1, wherein the processor is further configured to:
    determine the node link reliability of the receiving node link by determining a cyclical redundancy check errors of packets communicated through the receiving node link.

3. The system of claim 1, wherein the processor is further configured to:
    communicate the identified receiving node link to a network topology database when the node link reliability exceeds the threshold value.

4. The system of claim 1, wherein the processor is further configured to:
    store a reverse link affinity reliability indicator at one or more of a first node, a second node, a third node, and a network topology database.

5. The system of claim 4, wherein the receiving node link is a logical receiving link associated with the second node.

6. The system of claim 4, wherein the receiving node link is a logical receiving link associated with the third node.

7. A method, comprising:
    storing logical transmission links, logical receiving links, and metrics for data packets of nodes;
    determining a threshold value for node link reliability;
    determining the node link reliability of a receiving node link by evaluating data loss associated with one or more incoming data packets;
    comparing the node link reliability to the threshold value;
    determining one or more metrics for incoming ultra-reliable low latency communications (URLLC) data packets;
    communicating the one or more determined metrics;
    identifying the receiving node link when the node link reliability exceeds the threshold value; and
    communicating the identified receiving node link to a plurality of nodes.

8. The method of claim 7, further comprising determining the node link reliability of the receiving node link by determining cyclical redundancy check errors of packets communicated through the receiving node link.

9. The method of claim 7, further comprising communicating the identified receiving node link to a network topology database when the node link reliability exceeds the threshold value.

10. The method of claim 7, further comprising storing a reverse link affinity reliability indicator at one or more of a first node, a second node, a third node, and a network topology database.

11. The method of claim 10, wherein the receiving node link is a logical receiving link associated with the second node.

12. The method of claim 10, wherein the receiving node link is a logical receiving link associated with the third node.

13. A non-transitory computer-readable storage medium, the computer-readable storage medium including instructions that when executed by a computer, cause the computer to perform operations of:
   determine a threshold value for node link reliability;
   determine the node link reliability of a receiving node link by evaluating data loss associated with one or more incoming data packets;
   compare the node link reliability to the threshold value;
   determine one or more metrics for incoming ultra-reliable low latency communications (URLLC) data packets;
   communicate the one or more determined metrics;
   identify the receiving node link when the node link reliability exceeds the threshold value; and
   communicate the identified receiving node link to a plurality of nodes.

14. The non-transitory computer-readable storage medium of claim 13, wherein the instructions cause the computer to perform an additional operation of:
   determine the node link reliability of the receiving node link by determining cyclical redundancy check errors of packets communicated through the receiving node link.

15. The non-transitory computer-readable storage medium of claim 13, wherein the instructions cause the computer to communicate the identified receiving node link to a network topology database when the node link reliability exceeds the threshold value.

16. The non-transitory computer-readable storage medium of claim 14, wherein the instructions cause the computer to perform additional operations of:
   store a reverse link affinity reliability indicator at one or more of a first node, a second node, a third node, and a network topology database.

17. The non-transitory computer-readable storage medium of claim 16, wherein the receiving node link is a logical receiving link associated with the second node.

* * * * *